United States Patent
Garg et al.

(10) Patent No.: US 6,929,199 B1
(45) Date of Patent: Aug. 16, 2005

(54) EXPLOSIVE FRAGMENTATION PROCESS

(75) Inventors: Ajay K. Garg, Northborough, MA (US); Michael D. Kavanaugh, North Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1527 days.

(21) Appl. No.: 08/785,711

(22) Filed: Jan. 17, 1997

(51) Int. Cl.$^7$ .............................................. B02C 19/12
(52) U.S. Cl. ............................... 241/1; 241/23; 241/25; 451/38
(58) Field of Search .............................. 241/1, 301, 2, 241/23, 25; 451/38

(56) References Cited

U.S. PATENT DOCUMENTS

| | | | | |
|---|---|---|---|---|
| 3,620,965 A | * | 11/1971 | Rosinski | 208/120 |
| 3,715,983 A | * | 2/1973 | Rosinski | 241/1 |
| 4,050,899 A | * | 9/1977 | Grube et al. | 241/2 X |
| 4,313,737 A | | 2/1982 | Massey et al. | 44/1 |
| 4,364,740 A | | 12/1982 | Massey et al. | 44/1 |
| 4,540,467 A | * | 9/1985 | Grube et al. | 241/2 X |

FOREIGN PATENT DOCUMENTS

WO 96/32226 10/1996

OTHER PUBLICATIONS

Gilbert C. Robinson, "The Relationship Between Pore Structure and Durability of Brick," 63 *Ceramic Bulletin*, No. 2, 295–300 (1984).*

* cited by examiner

*Primary Examiner*—Mark Rosenbaum
(74) *Attorney, Agent, or Firm*—Joseph P. Sullivan

(57) ABSTRACT

Porous ceramic particles can be fragmented by generating a gas inside the pores at a sufficient pressure to cause the particles to be fragmented. The preferred way of generating the pressure is by immersing the particles in a liquid that at ambient temperatures and pressures is a gas until the liquid is absorbed into the pores and thereafter rapidly changing the conditions such that the liquid becomes a gas resulting in explosive fragmentation of the ceramic particles.

22 Claims, No Drawings

EXPLOSIVE FRAGMENTATION PROCESS

BACKGROUND OF THE INVENTION

This invention relates to ceramic particles having shapes that are well adapted to use as abrasive grits and particularly to a process for the manufacture of such particles.

Abrasives particles are conventionally made by crushing larger pieces of the ceramic by a milling or roll crushing process. Such processes are highly energy intensive and result in particles with significant amounts of microfractures as result of the impacts that generated the particles. These microfractures are believed to be a source of weakness in the particles that reduce their effectiveness as abrasives.

When sol-gel processes were developed for the production of alumina abrasives, a gel is formed of a precursor form, usually boehmite and this gel is extruded of otherwise shaped into manageable pieces which are then dried to drive off the water. The dried gel, which is very friable, is then typically comminuted to approximately the desired range of particle sizes for the final abrasive particles and these particles are fired to produce the final abrasive particles.

Recently, in U.S. application Ser. No. 08/417,169 filed Apr. 5, 1995, it has been proposed to feed the dried gel while it still possesses at least 5% by weight of water content directly into the hot zone of a furnace to cause the water to expand explosively. This results in particles with a generally high aspect ratio and excellent abrasive properties.

It has now been discovered that a wide range of ceramic materials can be caused to comminute explosively to produce similar high aspect ratio particles without the application of impact forces. The present invention provides therefore an attractive zero impact process that is adaptable to the production of a wide range of ceramics in particulate form.

GENERAL DESCRIPTION OF THE INVENTION

The process of the invention comprises exposing a porous ceramic material to conditions such that the pores of the ceramic are occupied by gas at a pressure such that expansion of the gas upon release of the pressure causes fragmentation of the ceramic material.

In the context of this application the term "fragmentation" is intended to imply that, after fragmentation has occurred, less than 15% of the original particles remain unchanged in particle size and the rest are broken into smaller fragments.

The required pressure to cause the fragmentation varies with the ceramic and the degree of consolidation in the porous form. The gas can be caused to expand by simply rapidly releasing the pressure under which the gas filled porous ceramic was held. The explosive expansion that results causes the fragmentation of the particles. Another useful technique is to fill the pores with a liquid that is then caused to evaporate rapidly thus generating the internal pressure that causes fragmentation of the ceramic. This can be done by heating the ceramic rapidly. A preferred process of the invention however comprises immersing a porous ceramic material in a liquid that is gaseous at normal temperatures and pressures for a time sufficient for the pores of the ceramic material to be at least partially occupied by the liquid, then removing the particles from the liquid and then rapidly exposing them to conditions of temperature and/or pressure at which the liquid is a gas. This generates the required internal pressures essentially instantaneously and causes fragmentation of the particles. In this context the term "rapidly" in understood to imply that essentially all the pressure increase within the ceramic material occurs after it has been exposed to the temperatures and/or pressures that generate the fragmentation.

Suitable liquids for use in this preferred process according to the invention include compressed liquid refrigerants such as liquid ammonia and liquified chlorofluorohydrocarbons; liquified gases such as liquid nitrogen, liquid oxygen and supercritical carbon dioxide.

The technique used to cause the explosive expansion can be the application of heat as discussed above but more frequently, when the gas is generated in situ inside the pores by expansion of a liquid that is a gas at normal temperatures and pressures, it is preferred to place the particles in an inert liquid at normal pressures and temperatures sufficient to cause the rapid expansion. This has the effect of ensuring a uniform temperature environment, providing maximum contact area for rapid heat transfer, and of mitigating the effects of the explosive expansion. The liquid is described as "inert" with respect to the ceramic and the gas causing the fragmentation. This implies a lack of interfering chemical reaction or solution of either the ceramic or the gas. However this does not imply that the liquid could not be used as a vehicle for impregnation of the ceramic with desirable components.

The ceramic materials which can be fragmented by the process of the invention include aluminas, silicon carbide, silicon nitride, titanium nitride, titanium carbide and the like. Among the aluminas are included precursors of alumina such as boehmite and even alumina trihydrate. Such products contain bound water but this is not affected by the process of the present invention which may be repeated a number of times until the desired degree of fragmentation has been reached.

The porosity in the ceramic material used in the process of the invention should preferably be predominantly open porosity to permit access of the gas or liquid to be expanded. The amount of such porosity should be at least 5% by volume, and preferably from 10 to 30, such as from 10 to 20% by volume. There is no theoretical upper limit but in practical terms the ceramic should have a maximum porosity of up to 80% and more suitable 70% by volume. Preferred porosity ranges are from 10 to 80%, and more preferably from 20 to 50%, by volume.

The porosity can be generated during the forming process as is the case when an alumina intermediate or unsintered alpha alumina, (obtained by a sol-gel process), is used and the porosity is the result of phase changes. It can also result from the formation of finely divided ceramic particles into a paste which is then pelletized and dried such that the pellets comprise loosely agglomerated ceramic particles.

After the fragmentation it is usually necessary to fire the ceramic particles obtained to cause them to become fully sintered if use as an abrasive is contemplated. The temperature and time of sintering varies with the ceramic involved.

DESCRIPTION OF PREFERRED EMBODIMENTS

The invention is now described with particular reference to the following Examples which are intended to illustrate the invention but are not intended to imply any limitation on the essential scope thereof.

EXAMPLE 1

In this Example the ceramic used a sol-gel alumina which had been dried to eliminate free water and comminuted to particles of +12 mesh. It therefore comprised predominantly alpha alumina precursors such as boehmite.

The particles were immersed in liquid nitrogen under atmospheric pressure and were allowed to equilibrate thermally for approximately 2 minutes, after which the excess liquid nitrogen was decanted and the particles were immediately transferred to a container of liquid octane at room temperature. This resulted in an explosive expansion of the liquid nitrogen which caused fragmentation of the alumina. The octane was decanted and the alumina particles were dried and graded. The size distribution was as follows:

| SIZE RANGE | PERCENT IN RANGE |
|---|---|
| +12 mesh | 11 |
| −12+16 mesh | 20 |
| −16+18 mesh | 13 |
| −18+20 mesh | 14 |
| −20+25 mesh | 16 |
| −25+35 mesh | 13 |
| −35+45 mesh | 5 |
| −45 mesh | 7 |

When a similar sol-gel alumina starting material was placed directly into octane under the same conditions but without the prior immersion in liquid nitrogen, no significant fragmentation occurred.

EXAMPLE 2

The fragmented product obtained from Example 1 was subjected to exactly the same process to determine if further comminution could be achieved. The particle sizes obtained are set forth below.

| SIZE RANGE | PERCENT IN RANGE |
|---|---|
| +12 mesh | 0 |
| −12+16 mesh | 5 |
| −16+18 mesh | 4 |
| −18+20 mesh | 11 |
| −20+25 mesh | 16 |
| −25+35 mesh | 28 |
| −35+45 mesh | 17 |
| −45 mesh | 16 |

This demonstrates that the process can be repeated to secure the desired degree of fragmentation.

EXAMPLE 3

In this Example the ceramic used was silicon nitride in the form of pellets with a circular cross-section of about 2.5 cm and a length of about 2.5 cm. These were obtained by slip casting colloidal silicon nitride. The pellets were immersed in liquid nitrogen where they were allowed to equilibrate for about 2 minutes before the liquid nitrogen was decanted and the pellets were placed in a container of water at about 50° C. This resulted in fragmentation of the pellets within a few seconds. The water was decanted immediately and the fragmented silicon nitride particles were dried and measured for size distribution. It was found that about 73% had sizes from 0.2 to 0.6 cm, about 17% had sizes from 0.2 to 0.08 cm, and about 10% has sizes below 0.08 cm.

When this experiment was repeated without the liquid nitrogen immersion, no significant fragmentation occurred.

EXAMPLE 4

In this Example the ceramic used was alpha alumina powder (Sumitomo AKP-30). A dispersion of 50 g of this powder in 500 ml of water with 1.0 g of Darvan-821-A dispersant was homogenized by rolling in a plastic jar with 1.2 cm zirconia media for about one hour. This suspension was dried at about 80° C. and dried pieces of +10 mesh size were immersed in liquid nitrogen for about 2 minutes after which the excess liquid nitrogen was decanted and the alumina pieces were place immediately into a container of liquid hexane at room temperature. The alumina was explosively fragmented and the resultant size distribution was as follows.

| SIZE RANGE | PERCENT IN RANGE |
|---|---|
| +10 mesh | 42 |
| −10+12 mesh | 22 |
| −12+16 mesh | 24 |
| −16 mesh | 10 |

When the above experiment was repeated without the nitrogen immersion no significant fragmentation was observed.

What is claimed is:

1. A process for producing fragmented ceramic comprising:
   a) contacting a porous ceramic material with a fluid whereby pores of the ceramic are at least partially occupied by the fluid, the ceramic material chosen from among alumina, one or more alumina precursors, silicon carbide, silicon nitride, and mixtures thereof; and
   b) causing the fluid to expand without chemical change to fragment the ceramic material.

2. A process according to claim 1 which includes causing the fluid which is a liquid to undergo a rapid expansion to a gaseous state.

3. A process according to claim 1 wherein the ceramic material has a porosity of from 10 to 80% by volume.

4. A process according to claim 1 wherein the ceramic material has a porosity of from 20 to 50% by volume.

5. A process for producing fragmented ceramic comprising:
   a) contacting a porous ceramic material with a fluid whereby pores of the ceramic are at least partially occupied by the fluid, the fluid being a gas at atmospheric pressure and a temperature of 20° C.; and
   b) causing the fluid to expand without chemical change to fragment the ceramic material.

6. A process according to claim 5 wherein the ceramic material chosen from among alumina, one or more alumina precursors, silicon carbide, silicon nitride, and mixtures thereof.

7. A process according to claim 5 which includes causing the fluid which is a liquid to undergo a rapid expansion to a gaseous state.

8. A process according to claim 5 wherein the ceramic material has a porosity of from 10 to 80% by volume.

9. A process according to claim 5 wherein the ceramic material has a porosity of from 20 to 50% by volume.

10. A process of claim 5 further comprising sintering the fragmented ceramic material.

11. A process for producing fragmented ceramic comprising:
    a) depositing a porous ceramic material into an inert liquid whereby pores of the ceramic are at least partially occupied by the liquid; and
    b) causing the fluid to expand without chemical change to fragment the ceramic material.

12. A process according to claim 11 wherein the ceramic material chosen from among alumina, one or more alumina precursors, silicon carbide, silicon nitride, and mixtures thereof.

13. A process according to claim 11 wherein the ceramic material has a porosity of from 10 to 80% by volume.

14. A process according to claim 11 wherein the ceramic material has a porosity of from 20 to 50% by volume.

15. A process for producing fragmented ceramic comprising:
   a) contacting a porous ceramic material with a fluid whereby pores of the ceramic material are at least partially occupied by the fluid, the ceramic material being chosen from among alumina, one or more alumina precursors, silicon carbide, silicon nitride, and mixtures thereof;
   b) causing the fluid to expand without chemical change to fragment the ceramic material; and
   c) sintering the fragmented ceramic material.

16. A process according to claim 15 wherein the fluid is a gas at atmospheric pressure and a temperature of 20° C.

17. A process according to claim 15 wherein the ceramic material has a porosity of from 10 to 80% by volume.

18. A process according to claim 15 wherein the ceramic material has a porosity of from 20 to 50% by volume.

19. A process for abrading a substrate surface comprising:
   a) contacting a porous ceramic material with a fluid whereby pores of the ceramic material are at least partially occupied by the fluid, the ceramic material being chosen from among alumina, one or more alumina precursors, silicon carbide, silicon nitride, and mixtures thereof;
   b) causing the fluid to expand without chemical change to fragment the ceramic material; and
   c) abrading a substrate surface with the fragmented material.

20. A process according to claim 19 wherein the fluid is a gas at atmospheric pressure and a temperature of 20° C.

21. A process according to claim 19 wherein the ceramic material has a porosity of from 10 to 80% by volume.

22. A process according to claim 19 wherein the ceramic material has a porosity of from 20 to 50% by volume.

* * * * *